United States Patent [19]
DeCasperis et al.

[11] 4,269,642
[45] May 26, 1981

[54] METHOD OF FORMING DENSIFIED EDGE SEALS FOR FUEL CELL COMPONENTS

[75] Inventors: Anthony J. DeCasperis, South Windsor; Richard J. Roethlein, Stafford Springs; Richard D. Breault, Coventry, all of Conn.

[73] Assignee: United Technologies Corporation, Hartford, Conn.

[21] Appl. No.: 88,993

[22] Filed: Oct. 29, 1979

[51] Int. Cl.³ .................. H01M 2/00; H01M 4/88; B29C 25/00; C01B 31/00

[52] U.S. Cl. .................. 156/89; 156/298; 264/29.1; 264/29.5; 264/109; 264/111; 428/408; 429/36; 429/44; 429/185

[58] Field of Search .............. 429/44, 45, 36, 35, 429/34, 38, 39, 40, 185, 237, 247, 249, 251; 204/294; 428/368, 408; 264/29.1, 29.2, 29.5, 109, 112, 118, 119, 120, 125; 156/62.2, 62.8, 155, 296, 182, 297, 298, 245, 89; 423/445, 447.2, 448, 447.4

[56] References Cited
U.S. PATENT DOCUMENTS

| | | | |
|---|---|---|---|
| 3,055,963 | 9/1962 | Krebs | 429/237 |
| 3,867,206 | 2/1975 | Trocciola et al. | 429/41 |
| 4,035,551 | 7/1977 | Grevstad | 429/44 |
| 4,115,528 | 9/1978 | Christner et al. | 264/29.5 |
| 4,115,627 | 9/1978 | Christner et al. | 429/44 |
| 4,165,349 | 8/1979 | Sandelli | 264/29.1 |

*Primary Examiner*—Michael W. Ball
*Attorney, Agent, or Firm*—Stephen E. Revis

[57] ABSTRACT

A porous fuel cell component, such as an electrode substrate, has a densified edge which forms an improved gas seal during operation when soaked with electrolyte. The edges are made from the same composition as the rest of the component and are made by compressing an increased thickness of this material along the edges during the fabrication process.

13 Claims, 5 Drawing Figures

METHOD OF FORMING DENSIFIED EDGE SEALS FOR FUEL CELL COMPONENTS

The Government has rights in this invention pursuant to Contract No. ET-77-C-03-1471 awarded by the Department of Energy.

CROSS REFERENCE TO RELATED APPLICATIONS

U.S. patent Ser. No. 088,995 titled "Porous Coolant Tube Holder for Fuel Cell Stack" by Robin J. Guthrie and U.S. patent application Ser. No. 088,994 titled "Fuel Cell Cooler Assembly and Edge Seal Means Therefor" by Richard D. Breault, Richard J. Roethlein and Joseph V. Congdon, filed on even date herewith and of common assignee with the present application, describes subject matter which is related to the present application.

BACKGROUND OF THE INVENTION

1. Field of the Invention

This invention relates to fuel cells, and more particularly to gas seals for fuel cells.

2. Description of the Prior Art

In a fuel cell, a matrix layer filled with electrolyte is sandwiched between a pair of electrodes. Each electrode comprises a substrate with a thin layer of catalyst disposed on the surface thereof facing the electrolyte. Each electrode substrate is constructed to permit a reactant gas (generally either air or hydrogen) to pass therethrough and contact the catalyst. This is the gas diffusion type of electrode. A common characteristic of all fuel cells is the necessity for preventing leakage and inadvertent mixing of the reactant gases both within and external to the cell. Since the electrode substrates (and certain other components of the fuel cell stack) are gas porous, means must be provided for preventing "in-plane" gas leakage from the edges of these substrates.

One type of edge seal is described in commonly owned U.S. Pat. No. 3,867,206 Trociolla et al. The key to that invention comprises altering the characteristics of the ends or periphery of the electrode substrates such that they can be saturated with a liquid and such that they will remain saturated with the liquid throughout operation of the cell. The liquid is held in the edge by capillary action and forms a barrier which prevents gas from escaping through the otherwise porous material. The liquid also forms a seal against the surface of adjacent components thereby preventing gas from escaping between the contacting surfaces of these components. Prior art electrodes have a typical mean pore size of 40–80 microns. This pore size is too large for the edges to hold electrolyte with sufficiently high capillary force to provide a satisfactory seal. The hereinabove referred to Trociolla et al patent teaches reducing the pore size along the edges by impregnating the edges with a hydrophilic material. Commonly owned U.S. Pat. No. 4,035,551 teaches impregnating the edge portions with the same material from which the electrolyte retaining matrix is made (col. 7, lines 4–19). Impregnation may be accomplished by forming an aqueous dispersion of the impregnating material; screen printing this "ink" onto the edge; and removing the liquid carrier by heating.

In the past we have successfully impregnated the edges of 0.010–0.020 inch thick substrates with an inert material such as silicon carbide. However, with the advent of ribbed substrates such as shown and described in commonly owned U.S. Pat. No. 4,115,627, uniform and adequate impregnation of the edges has not been possible using prior art techniques because the thickness of the ribbed substrates is 5 to 7 times greater than the nonribbed substrates of the prior art. The problem is additionally aggrevated because present substrate pore sizes are only between 20 and 40 microns, which is much smaller than those of the prior art making impregnation more difficult. It has thus not been possible to obtain a uniform and adequate impregnation of, for example, silicon carbide within these edges. Using prior art techniques, our best effort with a 0.080 inch thick substrate having an initial pore size range of 28 to 43 microns has been to reduce the pore size to the range of 1.5 to 36.6 microns. These seals were not able to meet our leakage requirement of less than $1.0 \times 10^{-5}$ lbs. $N_2$/hr./inch of seal at a pressure drop of 4.0 inches of water.

SUMMARY OF THE INVENTION

One object of the present invention is an improved gas edge seal for gas porous fuel cell components.

Another object of the present invention is an improved method for forming gas porous fuel cell components with edges adapted to be saturated with electrolyte.

Accordingly, a fully graphitized, gas porous, resin bonded carbon fiber sheet with edge portions which are more dense and have smaller pores than the central portion therebetween is made by forming an intermediate product comprising carbon fibers and a thermosetting resin which is not fully cured, the intermediate product having increased thickness along its edges; simultaneously densifying at least the edge portions by compressing them to a thickness which is substantially the same as the desired final thickness of the central portion and curing the part; and further heating the part to carbonize the resin and subsequently graphitize the resin and carbon fibers.

The sheet of material made according to the foregoing process has a central portion bordered by a pair of edge portions wherein the central and edge portions have substantially the same thickness and composition, yet the density in the edge portions is greater than the density in the central portion. Edges having an 80% pore size range, of 1.5 to 18.0 microns have been made by this process, while the central portion is less than half the density of the edges and has an 80% pore size range of 28 to 43 microns. This 80% pore size range is a significant improvement over the 80% pore size range obtained using the impregnating process described in the prior art in U.S. Pat. No. 3,867,206 and results in reducing gas leakage by a factor of about ten under test conditions.

The most common application for the process of the present invention is to fabricate gas diffusion type electrode substrates for fuel cells wherein the edges must be sealed to prevent the escape of reactant gases. Other porous fuel cell stack components, such as the holder layers disposed between cells for carrying a coolant fluid through the stack, may also be made by the process of the present invention if there is concern that gaseous reactants can escape from the cell through the holder layer edges.

The foregoing and other objects, features and advantages of the present invention will become more apparent in the light of the following detailed description of preferred embodiments thereof.

DESCRIPTION OF THE PREFERRED EMBODIMENT

Figure 1:
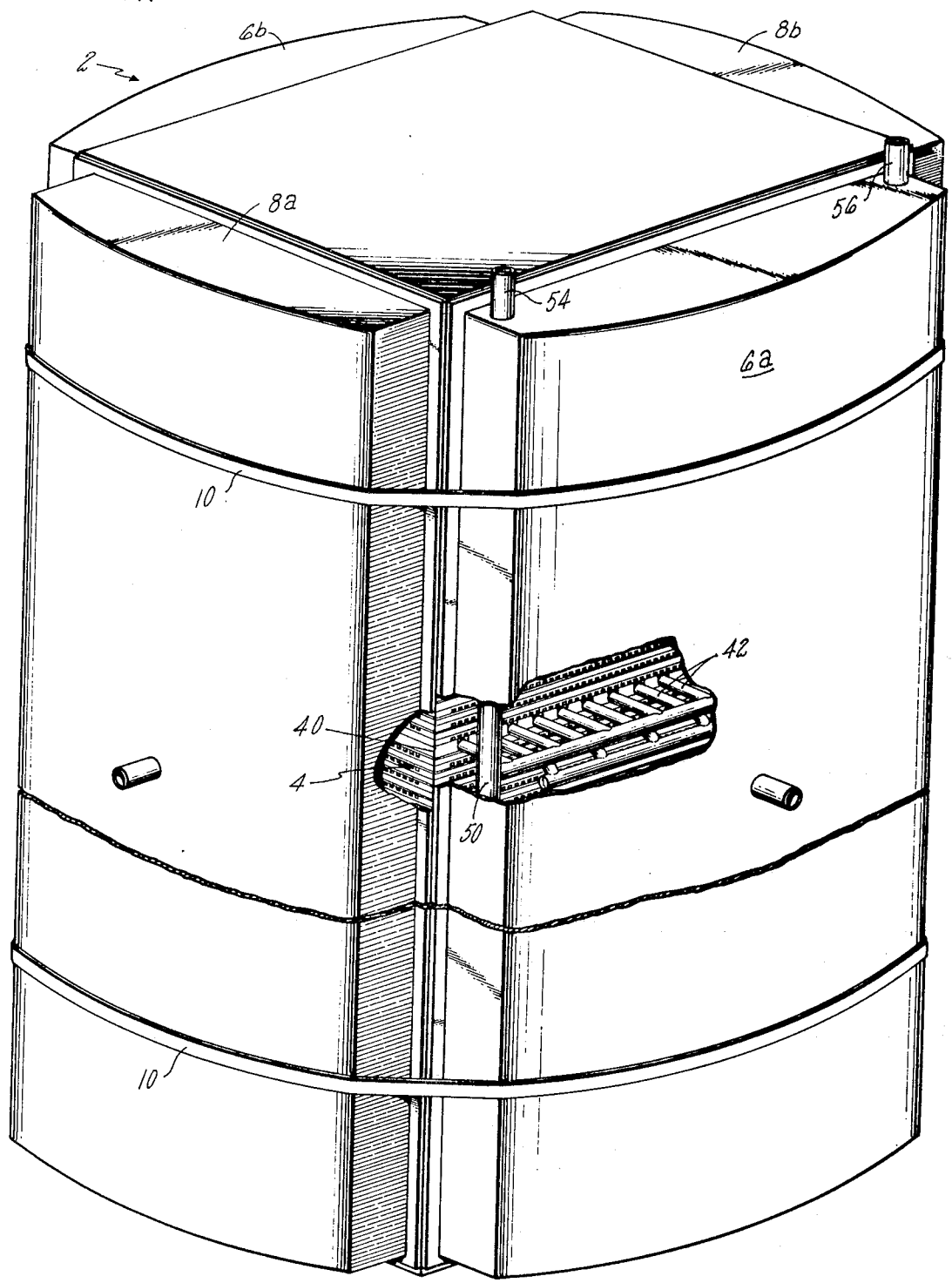
FIG. 1 is a perspective view, partly broken away, showing a fuel cell stack assembly incorporating components made according to the process of the present invention.

Referring to FIG. 1, a fuel cell stack assembly is generally referred to by the number 2. The assembly 2 includes a fuel cell stack 4 with reactant gas manifolds 6a, 6b, 8a, 8b covering each of the four surfaces of the stack. Manifolds 6a, 6b are the fuel (i.e., hydrogen) inlet and outlet manifolds, respectively; and manifolds 8a, 8b are the oxidant (i.e., air) inlet and outlet manifolds, respectively. The manifolds are held in sealing relationship to the faces of the stack 4 by a plurality of bands 10.

Figure 2:
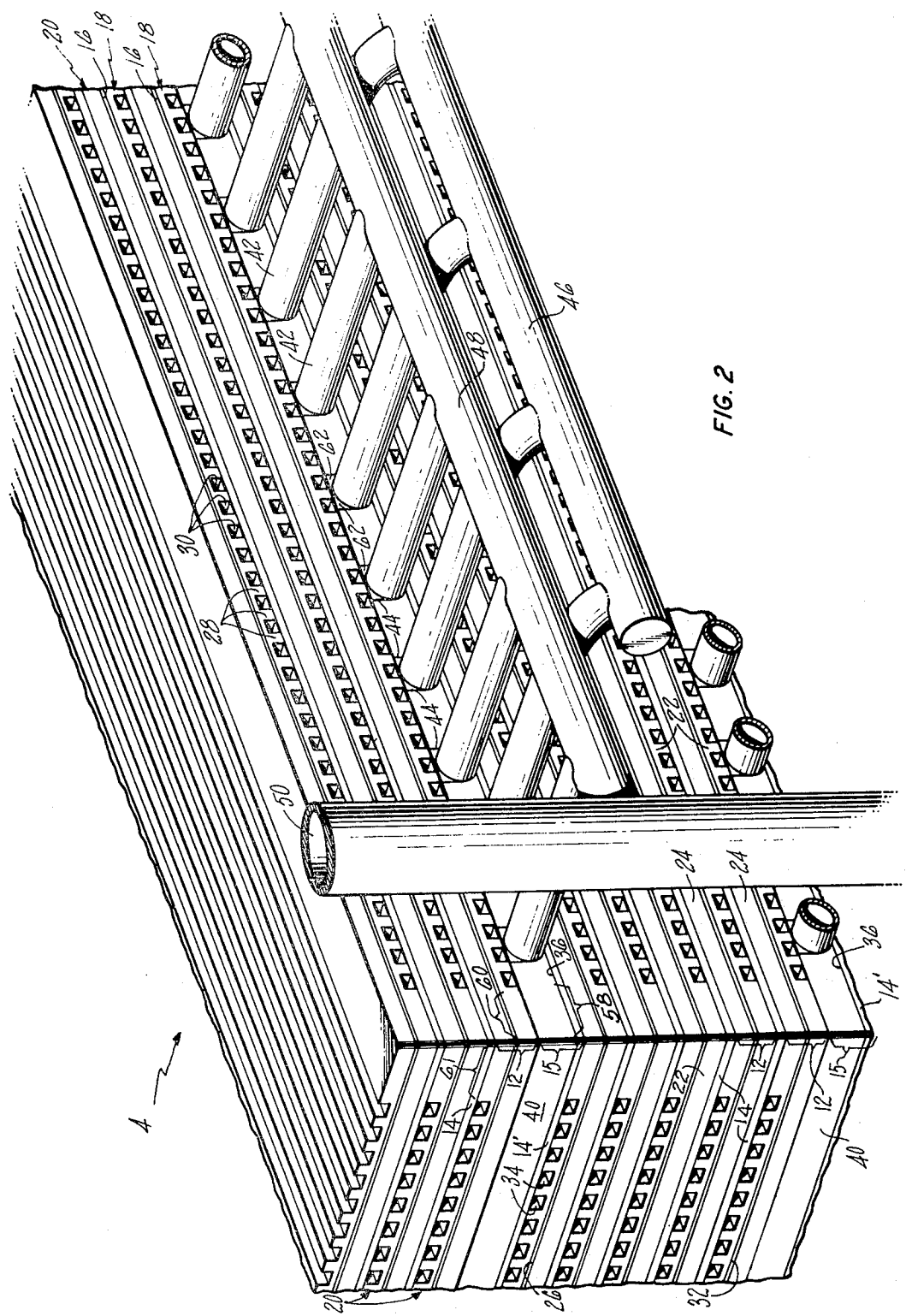
FIG. 2 is an enlarged view of a portion of the fuel cell stack of FIG. 1.

Details of the fuel cell stack 4 are best shown in FIG. 2. Each stack 4 is comprised of a plurality of fuel cells 12 separated by either a single, flat, gas impervious separator plate 14, or by a coolant holder assembly 15, which includes a separator plate 14' which is identical to the separator plates 14. The gas impervious plates 14, 14' may be made by any known method and of any material which is compatible with and can withstand the operating environment within the cell. If the fuel cell electrolyte is phosphoric acid these plates are usually made from graphite. For example they may be made by molding, under pressure, a dry mixture of graphite powder and thermosetting resin, the molded part subsequently being cured and then heat treated to a temperature of at least 2000° C. to graphitize the resin. Preferably the plate is no greater than 50 mils thick with 30 to 35 mils thick being most preferred. In this exemplary embodiment the plates 14, 14' are 33 mils thick, about 20 inches long, and about 20 inches wide.

The basic fuel cell construction is the same as that shown in and described in commonly owned U.S. Pat. No. 4,115,627 which is incorporated herein by reference. Each cell 12 includes a thin electrolyte retaining matrix layer 16 having an anode electrode 18 disposed on one side thereof and a cathode electrode 20 disposed on the other side thereof. Phosphoric acid is the electrolyte, and the matrix layer 16 between the anode and cathode electrodes is preferably a 5 mil thick layer of silicon carbide with a binder such as polytetrafluoroethylene, as described in commonly owned U.S. Pat. No. 4,017,664.

The anode and cathode electrodes each comprise an 80 mil thick fibrous gas porous substrate 22, 24, respectively. The anode substrate 22 includes a flat surface 26 which faces the matrix layer 16, and has a plurality of parallel ribs 28 on the opposite surface. On the flat surface 26 of the substrate is disposed a thin layer of catalyst (not shown). The catalyst layer preferably has a thickness on the order of only 2 to 5 mils. The ribs 28 define parallel grooves 30 therebetween which extend across the cell interconnecting the manifolds 6a, 6b. The inlet manifold 6a feeds a gaseous fuel such as hydrogen into the grooves 30. Unreacted hydrogen and reaction products exit from the other ends of the grooves 30 into the outlet manifold 6b.

The cathode electrodes 20 are similar in construction to the anode electrodes 18. Thus, on the flat surface 32 of the cathode substrate 24 is a thin layer of catalyst; and on the opposite side of the cathode substrate 24 are ribs which define grooves 34 for carrying the oxidant across the cells from the air inlet manifold 8a to the outlet manifold 8b in a direction perpendicular to the fuel flow across the anode electrodes 18.

Cooling is provided by passing a coolant fluid through the stack 4 in heat transfer relationship to the cells 12 which generate heat during operation. For this purpose a plurality of coolant holder assemblies, such as the assembly 15 shown in the drawing, are disposed between certain pairs of consecutive cells 12 in the stack 4. The number of coolant holder assemblies needed will depend on numerous factors relating to the desired maximum temperatures within the stack and the required uniformity of temperatures throughout the stack. In this embodiment the stack has about 270 cells and there is a coolant holder assembly after every fifth cell.

Each coolant holder assembly 15 comprises a gas impervious separator plate 14' resin bonded at its surface 36, to a gas porous, fibrous cooler holder layer 40. The coolant is carried in tubes 42 disposed in channels 44 machined into the cooler holder layer 40. The channels 44 are parallel to the grooves 30 in the anode electrode 18.

In this embodiment various pairs of tubes 42 are actually opposite ends of the same tube. A tube passes through the cell in one channel 44, makes a U-turn in the space formed by the outlet manifold 6b, and returns through a different channel 44 in the cell to the inlet manifold 6a. The "returning" tube ends are interconnected by a horizontal coolant inlet header 48. All the inlet headers 48 are interconnected by a vertical feed tube 50; and the outlet headers 46 are interconnected by a vertical return tube (not shown). Fresh coolant enters the vertical feed tube 50 at a main inlet 54 and is distributed to the inlet headers 48. The coolant then passes through the coolant tubes 42 and picks up heat from the cells 12. The heated coolant passes from the tubes 42, to the outlet headers 46, to the vertical return tubes and leaves the stack 4 via a main outlet 56.

In accordance with the present invention, the edge portions 58, 60 and 61 of the holder layers 40 and the electrode substrates 22, 24, respectively are significantly more dense (preferably two to three times more dense) than the central portion of each component located between these edges. (The central portions of the substrates 22, 24 are the ribbed portions; and the central portion of the holder layer 40 is the portion opposite the ribs of the adjacent substrate.) Yet, the composition of the edge portions is substantially the same as the composition of the central portion of each component, which eliminates problems associated with different rates of thermal expansion. During operation of the stack these edge portions are saturated with electrolyte and act in the same manner as the "wet seals" described in commonly owned U.S. Pat. No. 3,867,206. Thus they prevent, for example, fuel which is traveling through the anode substrate from passing into the oxidant manifolds 8a, 8b, and oxidant which is traveling through the cathode substrates from passing into the fuel manifolds 6a, 6b. They differ basically from the wet seals of the '206 patent in that the edge seals of the present invention do not include an impregnation of material for the purpose of reducing the pore size.

Figure 3:
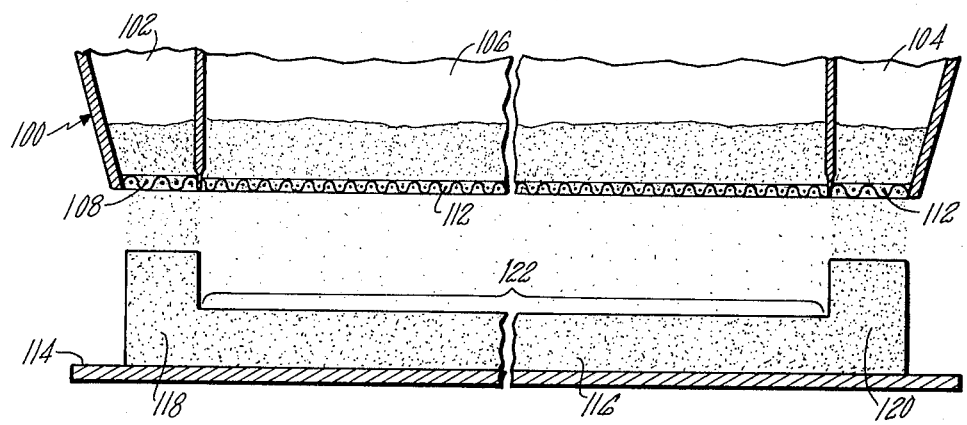
FIG. 3 is a simplified cross sectional view representing a step in one embodiment of the process of the present invention.

As an exemplary embodiment of the process of the present invention, consider the fabrication of the electrode substrate 22. The substrate 22 is made from a blend of chopped carbon fibers and thermosetting resin. A blend of 30% phenolic resin and 70% carbon fibers, by weight, is preferred. Referring to FIG. 3, to fabricate the substrate a dry blend of phenolic resin and carbon fibers is placed into a compartmented hopper 100. The hopper includes three compartments: edge seal compartments 102, 104 and central portion compartment 106. The bottom opening of each compartment is covered by a screen. The screens 108, 110 under the edge seal compartments 102, 104 have a larger mesh size than the screen 112 covering the bottom of the compartment 106. As a conveyor belt 114 moves under the hopper 100 (in a direction perpendicular to the plane of the drawing) the hopper is vibrated and the material passes through the screen onto the conveyor belt at a uniform, preselected rate which is determined by the belt speed, screen mesh size, material characteristics, hopper vibration mode, and other factors. To build up a greater thickness of material along the edges, the mesh sizes of the screens 108, 110 are selected such that the powder falls from the compartments 102, 104 at twice the rate as from the compartment 106. The result is what is herein referred to as an intermediate product 116, which, in this embodiment, is a powder comprising carbon fibers and uncured resin wherein the edge portions 118, 120 have been built up to a thickness twice as great as the thickness of the central portion 122. The intermediate product 116 is then simultaneously densified and cured by hot pressing between flat platens (rollers may also be used) to the desired thickness of the central portion at a temperature between 150° and 175° C. The press is set to exert 100 psi pressure over the central portion; due to the additional thickness along the edge portions, they receive a pressure of about 3000 psi. The edge portions 118, 120 will have the same thickness but twice the density of the central portion 116. The compacted, cured material is then further heated in an oven in steps up to about 2100° C. to first carbonize and ultimately fully graphitize the part. The reactant grooves 30 (FIG. 2) may then be machined into the substrate and a catalyst layer applied to the opposite surface.

Figure 4:
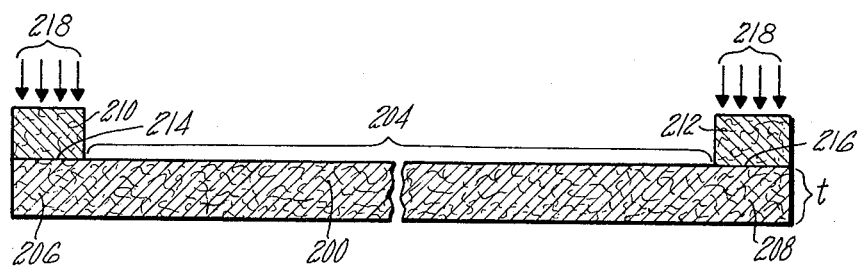
FIGS. 4 and 5 are simplified cross sectional views representing a part at different stages of another embodiment of the process of the present invention.

An alternate process for fabricating a fully graphitized gas porous, resin bonded carbon fiber sheet is described with reference to FIG. 4. This particular embodiment will also be described in connection with fabricating an electrode substrate, although a cooler holder could just as well be made by this process, or the previously described process. In this embodiment we start with an intermediate product 200 which is a gas porous sheet of thermosetting resin bonded carbon fibers which has been heated to the point where the resin has melted and bonded the structure to the extent it can be handled upon cooling, but the resin has not thermoset. Its thickness t is already the desired thickness of the finished substrate, and its porosity is already the porosity desired in the central portion 204 of the finished substrate. The intermediate product 200 has a pair of edge portions 206, 208 which are parallel to each other and perpendicular to the plane of the drawing. These edge portions are built-up by disposing strips 210, 212 along the top surfaces 214, 216 of the edge portions. The edge portions and strips are oriented so as to be parallel to the reactant gas grooves which will be formed in the part later. A light dusting of the same phenolic resin used to form the strips and the intermediate product 200 is optionally (but preferably) applied beneath the strips along the surfaces 214 and 216 to facilitate bonding.

Figure 5:
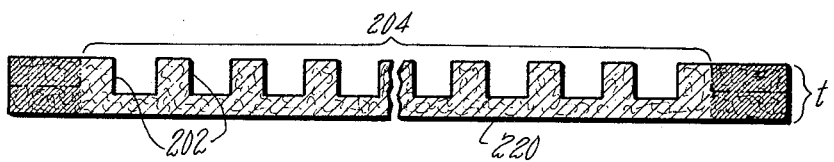

In the next step the strips 210, 212 are laminated to the intermediate product 200 by the simultaneous application of heat and pressure. The part is placed in a preheated press to which approximately 3000 psi pressure is applied to the strips 210, 212 in the direction of the arrows 218 for a period of 2-5 minutes. By the use of suitable shim stock, no pressure is applied to the central portion 204 of the intermediate product. The temperature used during compression should be sufficiently high to thermoset or fully cure the resin but not high enough to decompose it; and the pressure and temperature should be applied for sufficient time to rigidize the structure. The compressed part is then carbonized and fully graphitized as in the manner of the preceding process described with respect to FIG. 3. The resulting product is shown in FIG. 5 wherein reactant gas grooves 202 have been machined into the part. To form the substrate into a finished electrode a thin layer of electrocatalyst is applied to the bottom surface 220 in the area of the central portion 204.

Photomicrographs of a cross section of edge portions made according to the just described process indicate that a tightly formed network of uniform pores are present.

The table below presents gas leakage test data for a 75 mil thick electrode substrate having edge seals made in accordance with the prior art (as represented by U.S. Pat. No. 3,867,206) and edge seals made in accordance with the immediately preceding process. In the prior art process, silicon carbide was used as the impregnating material.

| | GAS LEAKAGE TEST DATE | | | |
| --- | --- | --- | --- | --- |
| | Prior Art Process | | Process of Present Invention | |
| | Central Portion | Edge Seal Portion | Central Portion | Edge Seal Portion |
| Open Porosity | 75% | 64.4% | 75% | 49.5% |
| Mean Pore Size (microns) | 35 | 8.3 | 35 | 7.6 |
| 80% Pore Size Range (microns) | 28-43 | 1.5-36.6 | 28-43 | 3.7-18.0 |
| Gas Leakage Rate (lbs N$_2$/hr/inch) | — | 5.0 × 10$^{-5}$ | — | 0.6 × 10$^{-5}$ |

A stack of fuel cells analogous to the stack shown in FIG. 2 was used in the tests. The edge seals were saturated with phosphoric acid, the sealing medium, which is also the cell electrolyte. The tests were run with nitrogen, rather than hydrogen; and gas leakage was measured in terms of the number of pounds of nitrogen escaping per hour per inch of seal length. Note that the present invention resulted in a gas leakage rate almost an order of magnitude less than that of the prior art.

In an effort to understand this change in leakage rate, mean pore size and the 80% pore size range of the samples were measured. (80% pore size range is the range of pore sizes wherein 10% of the pore volume is the result of pores larger than those within the range, and 10% of the pore volume is the result of pores smaller than those within the range.) From the data it became apparent that the reduction in leakage rate over the prior art is attributable to a reduction in the number and size of the larger pores. That is, a high end of the 80% pore size range was reduced from 36.6 microns to 18.0 microns. Note that the mean pore size hardly changed at all (i.e., it was reduced from 8.3 to 7.6 microns).

Based on this data it is estimated that the edge seals, to be highly effective, should have a mean pore size no greater than about 10 microns and an 80% pore size range having an upper limit of about 20 microns.

It should be understood that the invention is not limited to the particular embodiments shown and described herein, but that various changes and modifications may be made without departing from the spirit and scope of this novel concept as defined by the following claims.

Having thus described a typical embodiment of our invention, that which we claim as new and desire to secure by Letters Patent of the United States is:

1. In a process for fabricating a fuel cell component comprising a fully graphitized gas porous, resin bonded carbon fiber sheet having first and second oppositely facing surfaces and a pair of parallel edge portions separated by a central portion, wherein said edge portions are more dense than said central portion, the steps of:

forming an intermediate product comprising a homogeneous layer of carbon fibers and thermosetting resin, wherein the resin in said intermediate product has not been thermoset, said intermediate product including a pair of parallel edge portions separated by a central portion, said step of forming including building up the thickness of said edge portions such that they are thicker than said central portion with a material having substantially the same composition as said central portion;

densifying at least said edge portions by compressing said edge portions to a thickness which is substantially the same as the desired final thickness of said central portion, said step of densifying including applying heat to cure said resin; and heating said edge portions and said central portion to carbonize said resin and fully graphitize said resin and carbon fibers.

2. A process for fabricating a fuel cell component comprising the steps of:

disposing a gas porous strip of thermosetting resin bonded carbon fibers along each of two parallel edge portions of the top surface of a gas porous sheet of thermosetting resin bonded carbon fibers, the resin in said strips and sheet having been melted at a temperature high enough to bond the fibers but not high enough to thermoset said resin, the portion of said sheet between said strips being the central portion of said sheet;

laminating said strips and said sheet edge portions to a compressed thickness equivalent to the original thickness of said sheet edge portions by simultaneously heating and applying pressure to said strips and edge portions in a direction perpendicular to said top surface and without compressing said central portion of said sheet, said temperature being sufficiently high to thermoset said resin but not high enough to decompose said resin, said pressure and temperature being applied for sufficient time to rigidize the structure; and carbonizing and fully graphitizing said sheet.

3. The process according to claim 2 wherein said step of disposing includes applying a small amount of thermosetting resin between said strips and said edge portions to facilitate bonding during the step of laminating.

4. The process according to claim 2 wherein the uncompressed thickness and density of the strips is selected such that after lamination each laminated edge will have a mean pore size of less than about 10 microns and an 80% pore size range with an upper limit no greater than about 20 microns.

5. The process according to claim 4 wherein said component is an electrode for a fuel cell including the additional steps of:

applying an electrocatalyst layer to either the top or bottom surface of said central portion of said sheet after said step of carbonizing and graphitizing.

6. The process according to claim 4 including the step of forming a plurality of parallel grooves in the top or bottom surface of said central portion and applying an electrocatalyst layer to the central portion of the non-grooved surface, said grooves being parallel to said edge portions.

7. The process according to claim 4, 5, or 6 wherein, said strips and said sheet are substantially the same composition.

8. The process according to claim 7 wherein the pore size distribution through said laminated edge is uniform, and the density of said laminated edge is two to three times the density of said central portion.

9. A process for fabricating a fuel cell component comprising the steps of:

depositing a homogeneous dry powder mixture of thermosetting resin and carbon fibers on a surface to form an intermediate product, said product including two parallel edge portions, the portion of said product between said edge portions being the central portion of said product, the step of depositing including depositing a greater thickness of said powder mixture along said edge portions than in said central portion;

simultaneously curing said product and compacting said product perpendicular to said surface to a uniform thickness throughout and to result in said edge portion having a density between two and three times the density in said central portion; and heating said cured product to carbonize said resin and to subsequently fully graphitize said resin and carbon fibers.

10. The process according to claim 9 wherein the compacted thickness of said layer is substantially the same in said edge portions as in said central portion.

11. The process according to claim 10 including the step of forming a plurality of parallel grooves in one surface of said central portion, said grooves being parallel to said edge portions, and applying a layer of electrocatalyst to the opposite surface of said central portion.

12. The process according to claim 9 wherein said graphitized layer has a top surface and bottom surface, and said process includes the steps of applying a layer of electrocatalyst to one of said surfaces over said central portion thereof to form an electrode.

13. The process according to claim 9 or 11 wherein the edge portions of said graphitized product have a mean pore size of less than about 10 microns and an 80% pore size range with an upper limit no greater than about 20 microns.

* * * * *